United States Patent [19]
Thiele et al.

[11] Patent Number: 5,549,198
[45] Date of Patent: Aug. 27, 1996

[54] MULTIPACK FOR RECORDING MEDIA IN TAPE FORM WOUND ONTO HUBS

[75] Inventors: Hartmut Thiele, München; Hermann Brandstetter, Hoehenkirchen-Siegertsbrunn; Jose Toral, München; Rainald Hiller, Hemsbach; Bernd Scholtysik, München; Gottfried Lutz, Seefeld; August Liepold, München, all of Germany

[73] Assignee: BASF Magnetics GmbH, Mannheim, Germany

[21] Appl. No.: 336,231

[22] Filed: Nov. 3, 1994

Related U.S. Application Data

[63] Continuation-in-part of Ser. No. 119,060, filed as PCT/EP92/00543, Mar. 12, 1992 published as WO92/16436, Oct. 1, 1992, abandoned, and a continuation-in-part of Ser. No. 56,792, May 4, 1993, Pat. No. 5,405,101.

[30] Foreign Application Priority Data

Mar. 22, 1991 [DE] Germany .............. 41 09 360.7
May 12, 1992 [DE] Germany .............. 9206339 U

[51] Int. Cl.⁶ .................................................. B65D 85/67

[52] U.S. Cl. ............... 206/307; 206/394; 206/395; 206/397

[58] Field of Search .................... 206/391, 394, 206/395, 396, 397, 408, 415, 387, 389, 493, 444, 445, 387.1, 307

[56] References Cited

U.S. PATENT DOCUMENTS

| | | |
|---|---|---|
| 4,122,945 | 10/1978 | Borzak . |
| 4,491,222 | 1/1985 | Cacetta et al. . |
| 5,405,101 | 4/1995 | Toral et al. .................. 242/600 |

FOREIGN PATENT DOCUMENTS

| | | |
|---|---|---|
| 2501646 | 3/1981 | France . |
| 2031834 | 4/1980 | United Kingdom . |

*Primary Examiner*—Jacob K. Ackun
*Attorney, Agent, or Firm*—Keil & Weinkauf

[57] ABSTRACT

The invention relates to parallelepipedal packaging containers for recording media in tape form which are wound up onto hubs provided with internal bores and are stacked one on top of the other, comprising a bottom part, a top part and side parts, which are joined to one another by means of molded-on film hinges, and it being possible for a hub support to be pushed through the internal bores of the hubs.

10 Claims, 5 Drawing Sheets

MULTIPACK FOR RECORDING MEDIA IN TAPE FORM WOUND ONTO HUBS

This invention is a continuation-in-part of application Ser. No. 08/119,060, filed on Sep. 16, 1993, and now abandoned, which is the U.S. national stage application of PCT/EP92/00543, filed on Mar. 12, 1992 published as WO92/16436, Oct. 1, 1992, and application Ser. No. 08/056,792, filed on May 4, 1993, now U.S. Pat. No. 5,405,101, the disclosures of which are hereby incorporated by reference.

BACKGROUND OF THE INVENTION

1. Field of the Invention

The invention relates to one-part or multi-part parallelepipedal packaging containers for recording media in tape form which are wound up onto hubs provided with internal bores and are stacked one on top of the other, comprising a bottom part, a top part and side parts, which are joined to one another by means of molded-on film hinges and it being possible for a hub support to be pushed through the internal bores of the hubs.

Large quantities of what are known as pancake packs are sold worldwide by the magnetic tape producers. In these packs, the magnetic tape is wound up onto hubs, for example flangeless hubs, either what are known as NAB hubs or stackable hubs according to U.S. Pat. No. 4,081,151 or other hubs. At present, these pancakes are packed either individually or in multipacks and covered with a shrink film or held by various types of cardboard box.

The disadvantage of the individual pack is that a great deal of packaging material has to be used.

2. Description of the Related Art

Magnetic tape multipacks are disclosed by the publications U.S. Pat. No. 3,543,922, U.S. Pat. No. 4,708,246, U.S. Pat. No. 4,955,471, EP 0 320 751, DE- 8 900 709, DE-U 8 912 747 and DE-U 8 912 749. These packs consist either of relatively voluminous Styropor® (a registered trademark of BASF for its expandable polystyrene), which means that for transport they are bulky to no useful effect and have to be disposed of once the content has been unpacked, or the pack is held together by plastic pallets and sleeves, the sleeves being of a relatively complicated design and the side parts of the packed product in some cases being inadequately protected since they are covered only by a film shrink-fitted over the pack. Therefore, this pack has to be additionally placed into an outer case for transport.

Pancake packagings which avoid the use of Styropor® and which are reusable or recyclable are described in DE-U 9 011 867 and in the German application P 40 25 906. However, these packaging containers require many parts and in some cases offer inadequate protection of the content during transport and from dust.

Therefore, it is an object of the present invention to find a pack for pancakes of the generic type mentioned above which at the same time meets the following conditions:

- restriction to the minimum possible proportion of packaging materials to be thrown away
- simple design
- protects the pancakes during transit and from dust
- simple to assemble and to unpack
- not bulky in return transport
- reusable
- no additional outer packaging necessary.

SUMMARY OF THE INVENTION

We have found that this object is achieved by a plastic parallelepipedal packaging container for recording media in tape form which are wound up onto hubs provided with internal bores and are stacked one on top of the other, comprising a bottom part (1), a top part (2) and side parts (19), which are joined to one another by means of molded-on film hinges (24), it being possible for a hub support (11) to be pushed through the internal bores of the hubs (13), the packaging container having a recess (3, 4) in each case in the geometrical center of the inside of the bottom part (1) and the top part (2), from which recesses there protrude projections (5, 6, 7, 8 or 30, 31) between which the end faces (9, 10) of the hub support (11 or 40) can be fitted. One variant of the hub support-and-projections combination would have at least two projections each (5, 6, 7, 8) on the bottom and top part (1, 2), the end faces (9, 10) of the hub support (11) fitting unrotatably between them, with a part-annular shoulder (12) being arranged on the end face (10) of the hub support which engages into the bottom part (1), for supporting the hubs (13), the hub support (11) having a U-shaped carrying handle (14), provided with two locked positions, for drawing the hub support with the recording media out of the pack in the folded-open state, the two uprights (15, 16) of the carrying handle (14) being inserted into recesses close to the outside of the end face (9) which engages into the top part (2) and the handle (27) joining the two uprights not protruding beyond the end face (9) in the lower locked position, the hub support being provided in the center of this end face (9) with a recess (17) as a depression to aid in gripping the carrying handle (14), and sealing strips or tongues (18) being provided on the outer edges of the side parts 919) and/or of the top part (2), which strips or tongues engage in complementary grooves (20) of the top part (2) and/or of the side parts (19) when folding together the packaging container. Further developments of the invention emerge from the subclaims, the drawings and the description.

BRIEF DESCRIPTION OF THE DRAWINGS

The invention is explained in further detail below with reference to the drawings, in which.

DESCRIPTION OF THE PREFERRED EMBODIMENT

Figure 8:
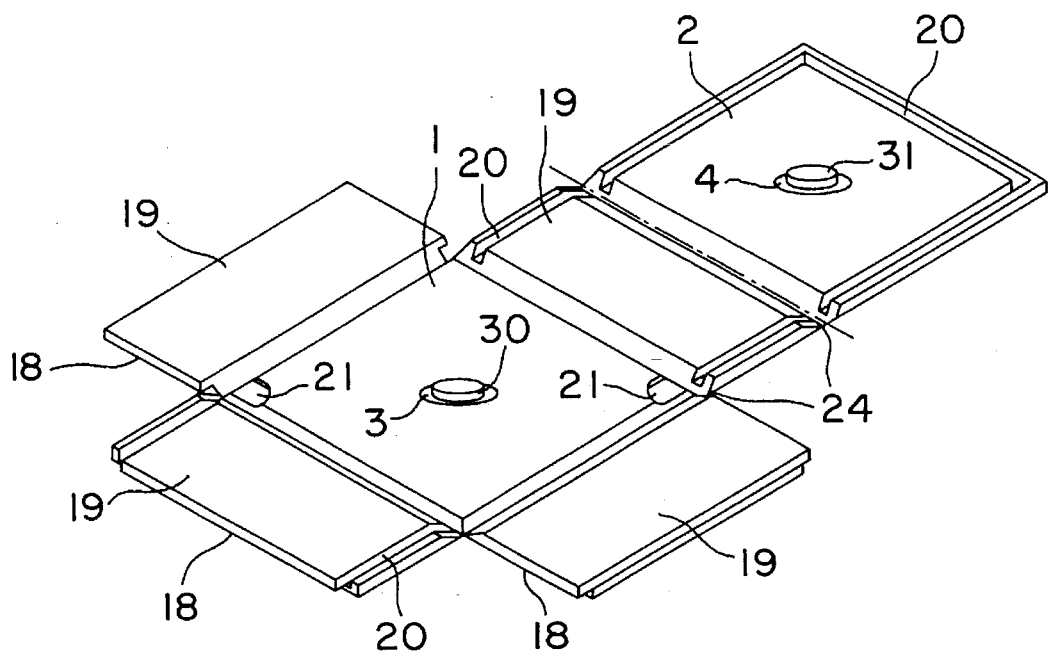
FIG. 8 shows an alternate version of a one-part packaging container in the completely folded-out state
Figure 9:
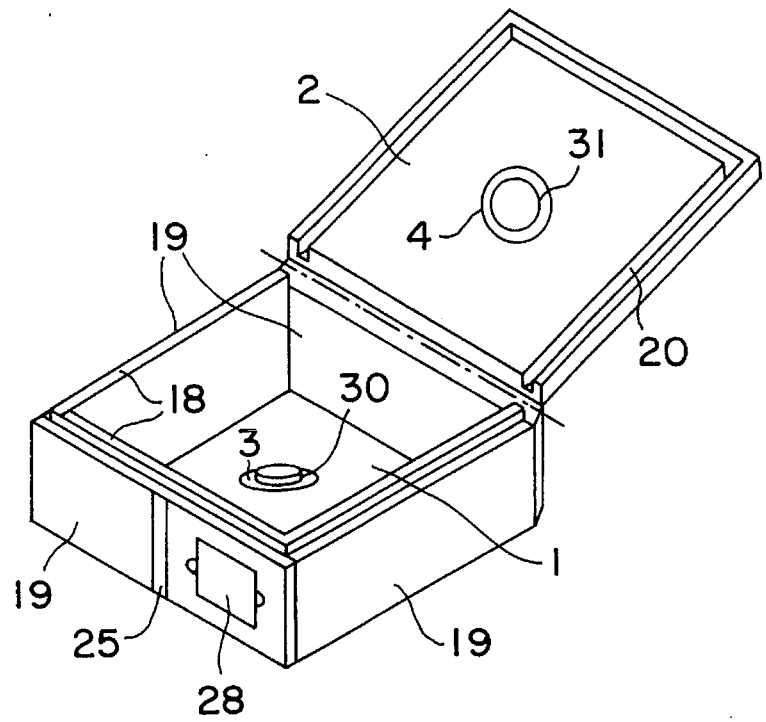
FIG. 9 shows the container of FIG. 8 in the partially assembled state

In a suitable form, the packaging container is made as one part and, as FIG. 8 shows, comprises a flat part, bottom part (1), top part (2) and the four side parts (19) being held together by what are known as film hinges (24), namely foldable joining tabs. The parts can be set at an angle, so that a parallelepipedal container is produced, as FIG. 9 shows. By means of a strap (not shown), which is laid around the recess (25) running around the folded-together container, the container is secured for transport. In addition, the strap may contain a carrying handle, it being possible for the outside of the pack to contain a depression for gripping to facilitate gripping such a handle. With the exception of this strap, all the parts of the pack according to the invention can be reused frequently and are suitable for return transport.

In order to open the container the strap, which consists of a material such as that used for securing pallets, is severed. The top part (2) is raised and the side parts (19) can be folded away in a simple way. The packed pancakes are thus freely accessible. The pancakes wound up onto hubs (13) are stacked one on top of the other on a specially made hub support (40), still to be described in detail. The hub support has an integrated handle (14). The pack itself does not produce any dust, as cardboard packs for example do, and could thus be brought as a unit into a clean room. In addition, at two opposite corners of the inside of the bottom part (1) there are depressions for gripping (21) to aid in lifting out the pancakes.

Once laid flat again, the pack can, with the aid of integrated stacking aids, be stacked in a convenient and space-saving manner on a pallet and thus prepared for return transport to the producer. by virtue of the flat form, without protruding corners and edges, the pack can be cleaned easily and advantageously. Flow channels thereby assist drying. There are no corners at which cleaning liquid can accumulate. Subsequently, a new packing cycle, as already described, can begin.

Now the design of the pack will be described in detail. To ensure the protection of the pack's content against dust and moisture, the container has on the outer edges, which are exposed in the folded-out state, of the side parts and/or of the bottom part and/or of the top part sealing strips or tongues (18), which engage in complementarily shaped grooves (20) of the corresponding parts during folding together. By appropriate technical measures, these strips or tongues and grooves can be designed so as to snap in place upon insertion. However, there may also be corresponding notches in the hinge region of the bottom (1) and of the side walls (19).

In the folded-together state, the hub support (40) is connected securely in the packaging container to the bottom part and the top part (1, 2). For this purpose the bottom and top part each have in the geometrical centers of their inside recesses (3, 4) projections (30, 31) which fit into the ends of the hub support (40).

Figure 10:
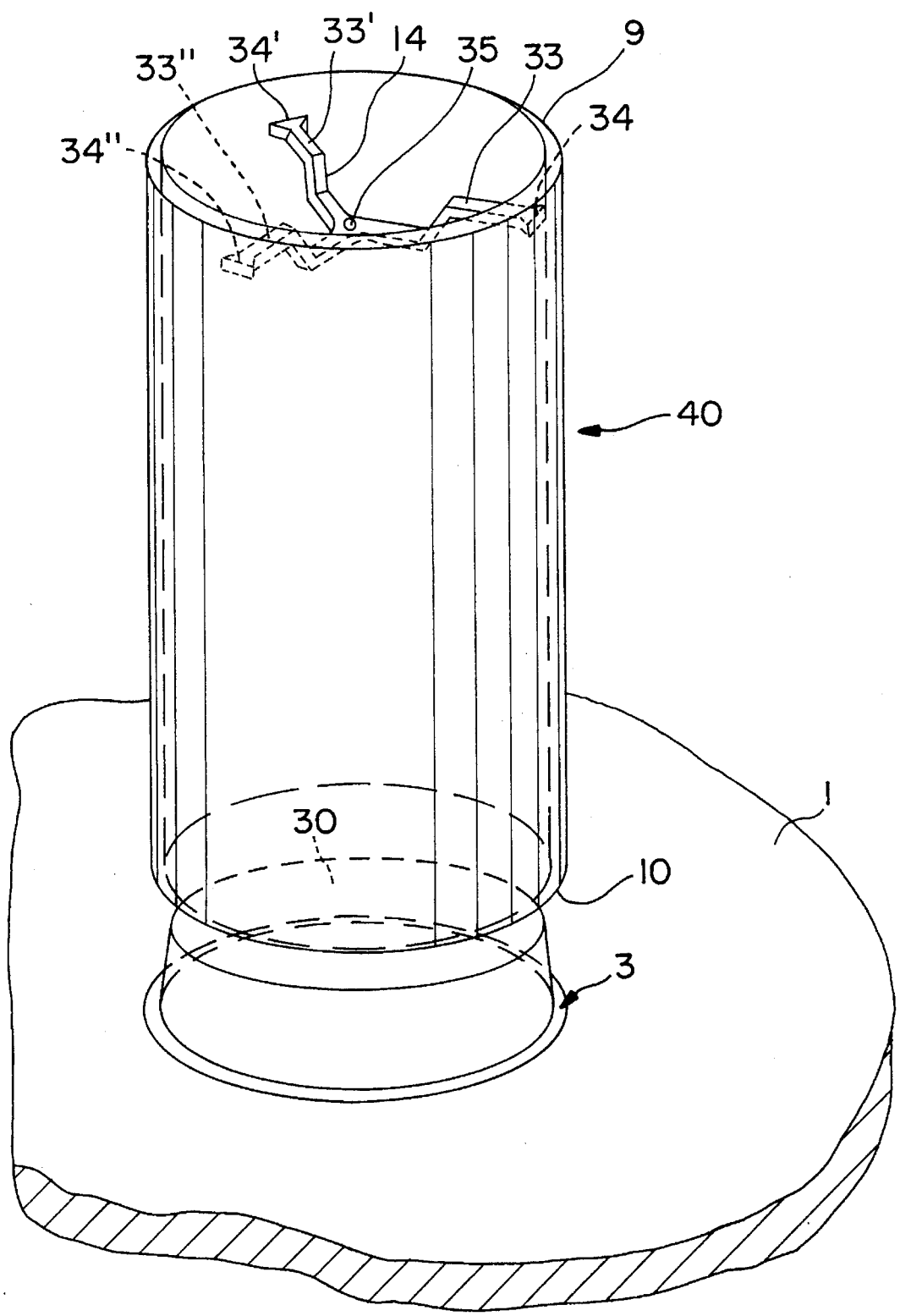
FIG. 10 shows details of an alternate hub support and of the anchorage in the bottom part.

The hub support itself is in the preferred embodiment made as described in co-pending application Ser. No. 08/056,792, of which this application is a continuation in part, and the disclosure of which is hereby incorporated by reference. That embodiment involves a hub support (40) with a plurality of arms (33, 33', 33") extending out from a gating point (35), and joining the inner circumference of the hub support (40) at a similar plurality of points (34, 34', 34"). This particular hub support design is especially advantageous for injection molding, the injection mold being designed in such a way that the material runs from the central gating point (35) via cavities defining the arms (33, 33', 33") to the cavity defining the shape of the rest of the hub support itself and thus fills the injection mold. Whereas the material issuing from the gating point to the desired shape, in this case the essentially cylindrical shape of the hub support, is ordinarily cut off and discarded during demolding, the beauty of this hub support design is that this material connection, which is suitable as a handle for gripping and lifting the hub support, remains connected to the hub support during demolding. In one variation, the arms (33, 33', 33") may be angled off, as shown in FIG. 10.

On one of the outer surfaces of the pack there may be provided a recessed label panel (28), which additionally can have depressions for gripping to aid in removing or exchanging a label.

Figure 1:
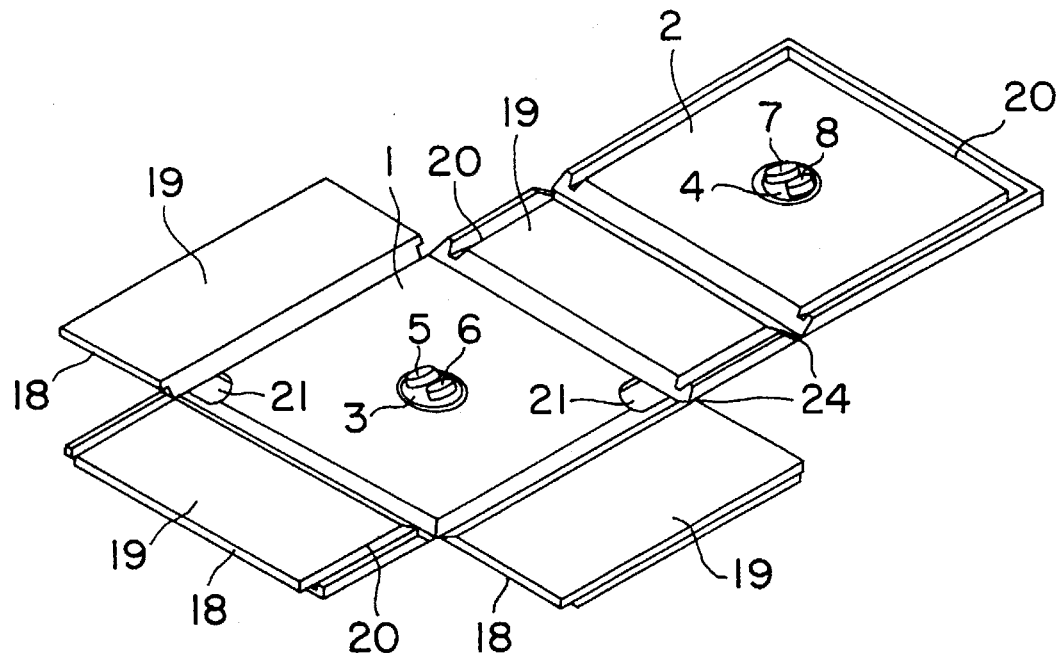
FIG. 1 shows a one-part packaging container in the completely folded-out state
Figure 2:
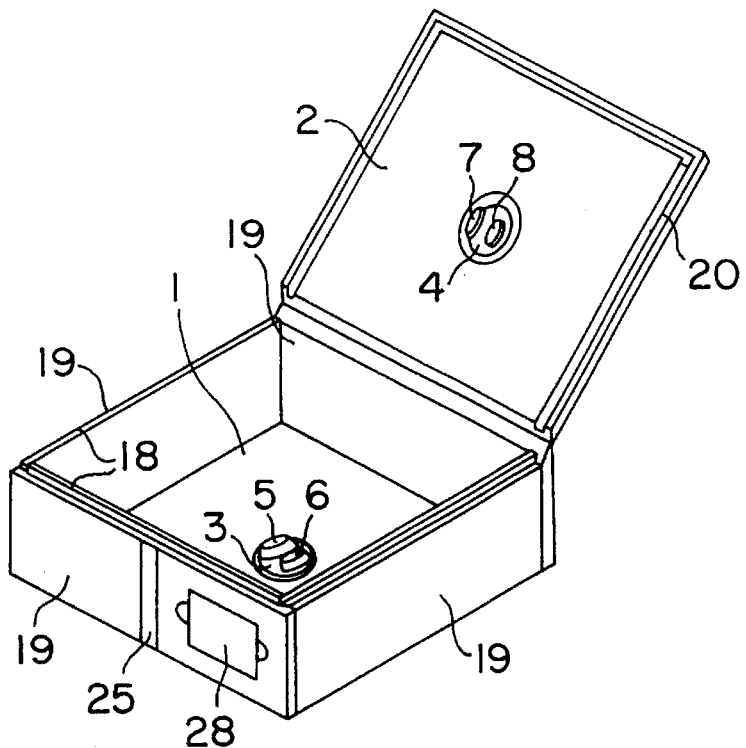
FIG. 2 shows the same container in the partially assembled state
Figure 3:
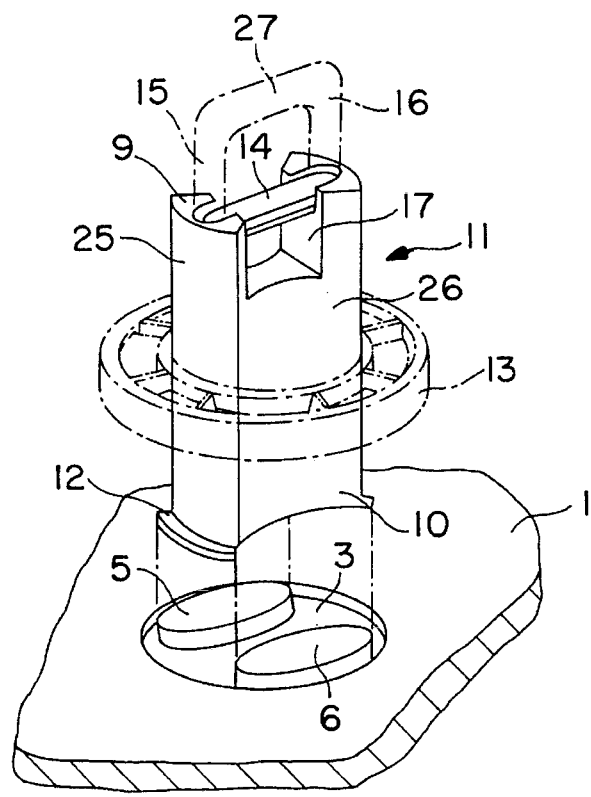
FIG. 3 shows details of one variant of the hub support and of the anchorage in the bottom part adapted to it
Figure 4:
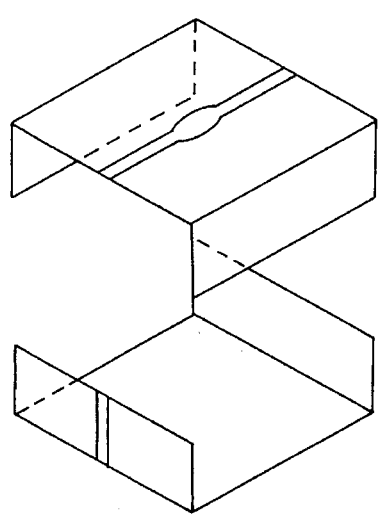
FIGS. 4 and 5 show two examples of two-part packaging
Figure 5:
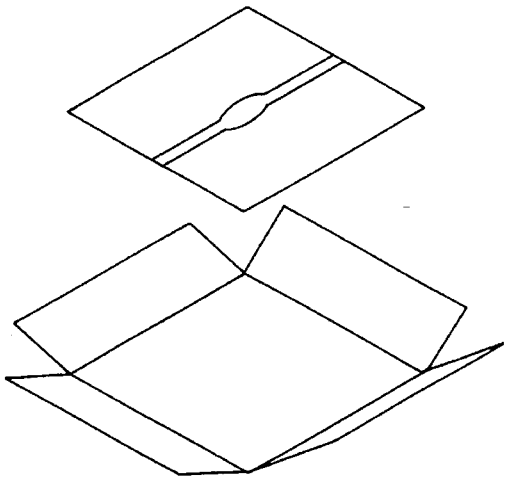

Instead of the one-part design described, the container according to the invention may also be made in two or more parts; FIGS. 4 and 5 show two possible embodiments, in which the bottom part and the top part are each joined to two side parts, or else the bottom part is joined to four side parts, onto which assemblage the separate top part is placed.

Figure 6:
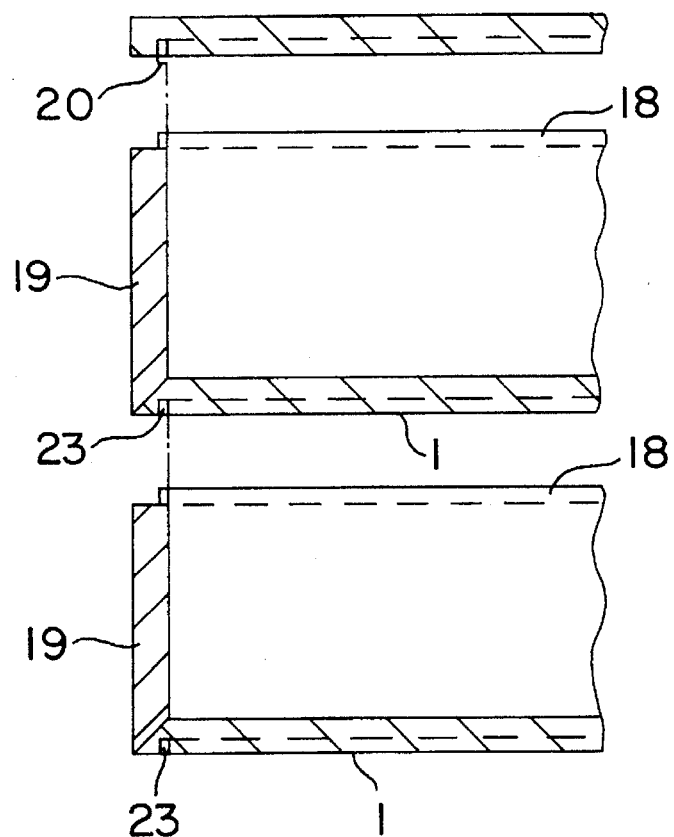
FIG. 6 shows the stacking of several packaging containers one on top of another

For transporting several packaging containers together in the folded-open state, they are expediently provided along the outer edges of their bottom parts or the top parts with grooves (23), which engage in corresponding complementarily shaped strips or tongues (18) of the folded-open side parts (19) and thus make it possible for several containers stacked one on top of the other to be transported without slipping against each other. This is shown in FIG. 6. In addition, each container may be provided on its outer surfaces with a studded structure, as is described for example in EP 0 217 254. In addition, the packaging container may be equipped on its underside with standing feet and recesses for better stacking on a pallet.

Figure 7:
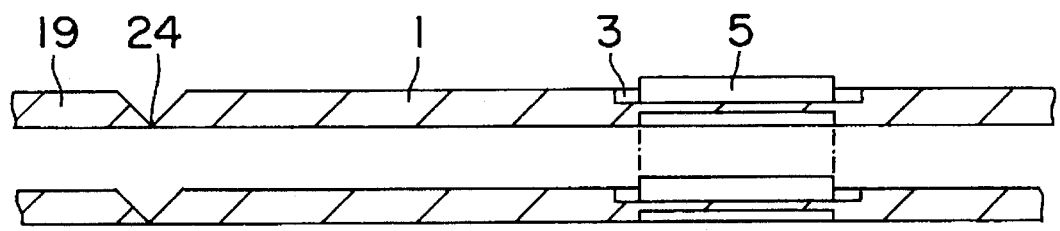
FIG. 7 shows a partial view of the fixing of the completely folded-open container part against slipping during return transport.

It is shown in FIG. 7 how two (or more) completely folded-out packs are stacked one on top of the other for return transport, projections (5) on the inside of the bottom part engaging in corresponding recesses of the outside.

In the case of the two-part form of the pack, the top part may be offset, in order to make different pack heights possible. In addition,m the peripheral sealing strip or tongue may be asymmetrical, in order to be able to form different pack heights, depending on use.

In a preferred configuration, the packaging container consists of rigid plastic, such as polypropylene or acrylonitrile-butadiene-styrene copolymer. It is preferably made with two walls, either by the injection-molding process or by extrusion blow molding. This additionally provides the container with outstanding protection against impact and climatic effects.

We claim:

1. A foldable plastic parallelepipedal packaging container for recording media in tape form which are wound up onto hubs provided with internal bores and are stacked one on top of the other, comprising a bottom part, a top part and side parts, which are joined to one another by means of molded-on film hinges, said side parts and bottom or top parts also having free edges which are not joined to one another by said hinges, the packaging container also comprising a hub support having a diameter and being formed as a hollow cylinder, within said hollow cylinder there is positioned a handling means, said diameter of the hub support being designed for matching with said internal bores of the hubs, the packaging container having annular recesses in each case in the geometrical center of the inward-facing surface of the bottom part and the top part from each of which recesses there protrudes at least one individual projection, whereby the end faces of the hub support are engageable by said projections and each of said recesses, said free edges of said side parts and bottom or top parts being provided with tongues and grooves corresponding to said tongues, such that where said free edges meet, one edge is provided with a tongue and the other with a groove, whereby when the packaging container is folded together said tongues engage said corresponding grooves, for sealing said recording media within said packaging container.

2. A packaging container as defined in claim 1, wherein the outer surfaces of the packaging container have a recess running around said container for receiving a strap, as well as a further recess for receiving a label.

3. A packaging container as defined in claim 2, wherein the further recess for receiving a label is provided with depressions to provide access for detaching the label, 4. A packaging container as defined in claim 1, wherein the bottom part has on its inside depressions for gripping at at least two opposite corners, for lifting out the recording media wound up onto hubs.

5. A packaging container as defined in claim 1, wherein the tongues engage in complementary grooves on the corresponding edges of the outside of the bottom part and/or in the grooves of the top part, for stacking several packaging containers one on top of the other secure from slipping.

6. A packaging container as defined in claim 1, wherein at least the outsides of the bottom part and of the top part are provided with a studded structure.

7. A packaging container as defined in claim 1, wherein, in the folded-out, stacked one on top of the other state of several containers, in each case projections on the inside of the bottom part engage in corresponding recesses on the outside of the next-lying bottom part.

8. A packaging container as defined in claim 1, wherein the container consists of a rigid plastic selected from the group consisting of polypropylene and an acrylonitrile-butadiene-styrene copolymer.

9. A packaging container as defined in claim 1, wherein the bottom part, side parts and top part are shaped with two walls by extrusion blow molding.

10. A packaging container as defined in claim 1, containing stackable hubs with magnetic tape wound thereon.

* * * * *

UNITED STATES PATENT AND TRADEMARK OFFICE
CERTIFICATE OF CORRECTION

PATENT NO.: 5,549,198

DATED: August 27, 1996

INVENTOR(S): THIELE et al.

It is certified that error appears in the above-identified patent and that said Letters Patent is hereby corrected as shown below:

On the cover page, item [30], the foreign application priority application numbers should be as follows:

"4109360.7" should be --P 41 09 360.7--; and
"9206339 U" should be --G 92 06 399.3--.

Signed and Sealed this

Fifth Day of November, 1996

*Attest:*

BRUCE LEHMAN

*Attesting Officer*     *Commissioner of Patents and Trademarks*